US012574526B2

(12) United States Patent
Bergeron et al.

(10) Patent No.:  US 12,574,526 B2
(45) Date of Patent:      Mar. 10, 2026

(54) METHOD FOR ANALYZING THE CHANGE IN A VIDEO STREAM FOR LIMITED-RATE AND LOW-LATENCY VIDEO CODING, AND ASSOCIATED DEVICE

(71) Applicant: THALES, Meudon (FR)

(72) Inventors: Cyril Bergeron, Gennevilliers (FR); Hichem Boukantar, Gennevilliers (FR); Valentin Felix, Gennevilliers (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 18/919,349

(22) Filed: Oct. 17, 2024

(65) Prior Publication Data

US 2025/0133217 A1      Apr. 24, 2025

(30) Foreign Application Priority Data

Oct. 19, 2023    (FR) ...................................... 2311291

(51) Int. Cl.
| | |
|---|---|
| *H04N 7/12* | (2006.01) |
| *G06V 10/75* | (2022.01) |
| *H04N 19/124* | (2014.01) |
| *H04N 19/159* | (2014.01) |
| *H04N 19/177* | (2014.01) |

(52) U.S. Cl.
CPC ......... *H04N 19/159* (2014.11); *G06V 10/758* (2022.01); *H04N 19/124* (2014.11); *H04N 19/177* (2014.11)

(58) Field of Classification Search
CPC ...................................................... H04N 19/87
See application file for complete search history.

(56) References Cited

U.S. PATENT DOCUMENTS 6,668,094 B1    12/2003  Yoo et al.

FOREIGN PATENT DOCUMENTS

EP           3 843 409 A1      6/2021

OTHER PUBLICATIONS

Coudert, et al., "Dominant motion estimation and video partitioning with a 1D signal approach", Proceedings of SPIE, vol. 3527, pp. 283-294, 1998.

*Primary Examiner* — Young Lee
(74) *Attorney, Agent, or Firm* — BakerHostetler

(57) ABSTRACT

A method for analysing the change between two frames of an uncompressed video stream, including estimating a shift and statistical deviation between all or part of the frames in at least one direction, and using the one or more computed shifts and statistical deviations to detect a significant change between the frames. A method for coding an uncompressed video stream, wherein information relating to a significant change is used to modify the uncompressed video stream or coding parameters of the uncompressed video stream, in order to avoid peaks in rate. A device implementing either of the methods, to a complete transmitting system, to a computer program product comprising program instructions allowing the steps of the methods to be executed, and to a recording medium comprising the computer program product.

12 Claims, 8 Drawing Sheets

METHOD FOR ANALYZING THE CHANGE IN A VIDEO STREAM FOR LIMITED-RATE AND LOW-LATENCY VIDEO CODING, AND ASSOCIATED DEVICE

CROSS-REFERENCE TO RELATED APPLICATION

This application claims priority to foreign French patent application No. FR 2311291, filed on Oct. 19, 2023, the disclosure of which is incorporated by reference in its entirety.

FIELD OF THE INVENTION

The invention relates to the field of video coding, and more particularly relates to the problem of transmitting compressed videos over communication links having limited rates and low-latency requirements.

A typical use case of the invention is teledriving, i.e. remote driving of any type of mobile device: car, train, boat, drone, robot, airship, etc. In these critical applications, frames of the environment of the device must be transmitted to a remote operator with the lowest possible latency. Depending on the type of mobile device, its speed or its distance, the communication capabilities of the transmission link allowing a video stream to be transmitted to remote equipment may be limited.

However, the invention is generally applicable to any type of application where a video is transmitted over a limited-rate communications link, and where latency must be kept down.

BACKGROUND

Video compression makes it possible to reduce the amount of information in a video stream to be exchanged between sending equipment and receiving equipment. Current standards, such as for example the standard AVC (AVC standing for Advanced Video Coding), the standard HEVC (HEVC standing for High Efficiency Video Coding) and many others, use predictive transmission schemes. Frames in a video stream are divided into blocks, and the blocks are predicted from other blocks belonging either to the current frame, or to previously coded/decoded frames. Residues, i.e. residual differences between the predicted blocks and the blocks to be transmitted, are transmitted after coding (for example via a discrete cosine transform (DCT)) and quantization. Thus, prediction makes it possible to take advantage of the temporal continuity between the frames of a video stream, as differences between two successive frames generally consist of small movements in the frame, or of frequency continuity within a video frame, as certain blocks are identical parts may be made up of identical blocks, to limit the amount of data to be transmitted.

In predictive coders, compression uses reference frames and predicted frames. The reference frames (I-frames) are key frames coded independently of the other frames of the video stream. Intra-frame prediction, or intra prediction, is spoken of. The blocks of the I-frames are predicted with respect to other previously coded blocks of the same frame, thus exploiting the frequency redundancy of the blocks.

Compression also uses frames predicted by inter-frame prediction, or P-frames (P standing for predicted). These frames are predicted from I-frames and/or other P-frames, thus exploiting the temporal redundancy of the blocks.

There are other types of frames, for example such as bidirectional frames (B-frames), which use inter prediction with respect to frames before and/or after the current frame, or IDR frames (IDR standing for Instantaneous Decoder Refresh), which use intra prediction and serve to purge the memory of the coder to prevent propagation of prediction errors. Although described below solely with reference to I-frames and P-frames, the invention is applicable regardless of the configuration of the frames of the predictive coder used.

FIG. 1a schematically shows the principles of predictive coding for frames of a video stream. Successive frames are grouped into subsets called GOPs (GOP standing for Groups Of Pictures). GOPs typically start with an I-frame, followed by a series of P-frames. Many GOP schemes are possible, and video-compression standards are generally able to switch between a plurality of transmission schemes depending on the type of video stream to be compressed.

Prediction makes it possible to substantially limit the amount of data required to transmit one block. In FIG. 1a, the heights of the representations of the frames are representative of the size of the coded frame. Since P-frames use inter-frame prediction, their size is markedly smaller than that of I-frames, which use intra-frame prediction.

The size of the I- and P-frames is also related to the level of residue quantization. Quantization levels are chosen depending on the rates being targeted for the compressed video. In the context of a limited-rate link, quantization parameters are dimensioned so that the rate of the compressed video is as close as possible to the rate capacity of the link over which the compressed video is transmitted, in order to optimize the quality of the transmitted video stream. Since the compression ratio of a video stream is uncertain, certain video coders have the ability to dynamically adjust the quantization parameters of the video streams.

A problem occurs when an abrupt scene change occurs in the video stream, upstream of a P-frame predicted with respect to a prior frame (P- or B-frame). Such a change may for example occur when a teledriven vehicle enters a tunnel, or in the case of an abrupt change in the orientation of the camera acquiring the video stream, or in the case of a change of camera, etc. The temporal prediction then no longer works in the frame following the scene change. Below, a significant change will be spoken of to designate a change between two frames that makes inter-frame prediction suboptimal, or a change sufficient to cause the instantaneous rate of the coded stream to increase above an acceptable threshold, this threshold being related to the bandwidth of the transmission link and to the tolerable latency.

FIG. 1b illustrates the impact of a significant change on the predictive coding of FIG. 1a for a prior-art coder that does not dynamically adjust the rate of the compressed video stream.

In FIG. 1b, the change takes place at the time 101, upstream of a P-frame. Because of the scene change, the current P-frame is not able to identify in the previously coded frames blocks suitable for inter-frame prediction. Thus, the amount of block residues to be transmitted increases substantially, and hence the P-frame may be much larger in size than an I-frame when the change concerns a significant area of the frame. The instantaneous rate of the compressed video then increases, this, when the communications link is rate-limited, resulting in an increase in the amount of data stored in the buffer memories of the equipment generating the data link, and resulting in an increase in the latency of the communications link. If the buffer memories of the transmission equipment are limited, this effect may lead to memory saturation and to data loss. To avoid increasing the latency of the transmission and saturating the buffer memories, it is possible to delete segments of the video stream to be transmitted as it is being sent, but this leads to interruptions in the video stream that adversely affect its visual quality.

If the current frame is an I-frame, using intra prediction, the significant change 101 has no effect on the instantaneous rate of the video stream.

Patent application EP 3 843 409 A1 describes a method allowing instantaneous peaks in rate to be absorbed in the context of transmission of a video stream over a limited-rate link. This solution consists in monitoring the variations in the level of the buffer storing the video stream before it is sent, and when the rate increases, in duplicating one or more frames in the video stream. The duplicated frames are coded very efficiently by inter-frame coding, this causing a decrease in the instantaneous rate making it possible to compensate for the peak. However, this solution has the drawback of operating retroactively, in response to an increase in the instantaneous rate, and requires a feedback loop between the equipment used to transmit the compressed video stream and the video coder.

FIG. 1c illustrates the impact of a significant change on the predictive coding of FIG. 1a for a prior-art coder that dynamically adjusts the rate of the compressed video stream. In the event of a peak in instantaneous rate, such a coder adapts the quantization parameters of the following frames so as to achieve a target rate. In this case, following the significant scene change, which occurs at 101, the size of the P-frame following the change increases, this leading to a substantial increase in the instantaneous rate. To comply with the rate constraint, the coder adapts the quantization parameter of the following frames. This mechanism leads to a decrease in the quality of the video stream transmitted after the change.

Lastly, there are recursive coders, which re-code the video stream with different coding parameters when the maximum target rate is exceeded, so as to guarantee that a rate constraint is met. However, this mechanism is very costly in terms of computational power since the video stream may need to be coded a number of times, and is unsuitable for live transmission.

There is therefore a need for a simple method allowing significant scene changes between the frames of an uncompressed video stream to be identified, in order to take this change into account when coding the video stream, in particular in the context of transmission of the compressed video stream with a limited rate and a low-latency requirement. Thus, the video coder is able to adapt its coding to take into account the sudden variation in the detected frame.

SUMMARY OF THE INVENTION

To this end, the present invention describes a method for analysing the change between two frames of an uncompressed video stream, comprising estimating a shift and a statistical deviation between all or part of said frames in at least one direction, and using the one or more computed shifts and statistical deviations to detect a significant change between said frames.

According to one embodiment of the method for analysing the change between two frames of an uncompressed video stream according to the invention, estimating a statistical deviation and a shift between all or part of the frames in at least one direction comprises, for each direction in question:

a first step of applying a Mojette transform to each of the frames in order to determine, for each frame, a vector corresponding to a projection of the frame in the direction in question, a second step of computing a cross-correlation between the vectors obtained by applying a Mojette transform to the two frames in said direction in the first step of the method, then measuring a shift based on the results of the cross-correlations, a third step of measuring a statistical deviation between the vectors obtained by applying a Mojette transform to the two frames in the direction in question in the first step of the method, after compensating for the associated shift computed in the second step of the method.

According to various possible embodiments of the method for analysing the change between two frames of an uncompressed video stream according to the invention, said at least one direction may comprise one or more directions selected from a horizontal direction and a vertical direction.

According to one embodiment of the method for analysing the change between two frames of an uncompressed video stream according to the invention, using the one or more computed shifts and statistical deviations to detect a significant change between said frames comprises:

comparing the one or more shifts or a combination of the shifts with one or more thresholds, and comparing the one or more statistical deviations or a combination of statistical deviations with one or more thresholds.

Advantageously, at least one among the one or more shifts or the combination of shifts and the one or more statistical deviations or the combination of statistical deviations is compared with a plurality of thresholds in order to quantify the magnitude of said change.

The invention also relates to a method for coding an uncompressed video stream composed of a succession of frames, comprising, for at least one pair of frames among said succession of frames, a step of analysing the change between two frames of an uncompressed video stream such as described above, and a step of predictively coding the uncompressed video stream, in which step, when a significant change is detected in the step of analysing the change, the uncompressed video stream or coding parameters of the video stream are modified so as to attenuate an increase, in the rate of the video stream after predictive coding, that is associated with said significant change.

According to one embodiment, modifying the coding parameters comprises one or more elements among:

modifying a quantization step of the predictive video coding, reducing a rate setting applied to the predictive video coding, using an intra-frame coding mode, starting a new group of pictures (GOP), replacing the oldest frame with the newest frame.

According to one particular embodiment of the method for coding an uncompressed video stream according to the invention, the frames of said pair of frames are successive frames of the uncompressed video stream, and modifying the uncompressed video stream comprises copying the oldest frame instead of the newest frame.

The invention also relates to a device comprising computing means configured to implement a method according to the invention, and to a system for transmitting a video stream comprising:

means for acquiring an uncompressed video stream, computing means configured to implement a method for
coding an uncompressed video stream according to any
embodiment of the invention on the uncompressed video stream to obtain a compressed
video stream, means for transmitting the compressed video stream, means for acquiring the compressed video stream, means for decoding the compressed video stream to
obtain a decompressed video stream, and means for displaying the decompressed video stream.

It also relates to a computer program comprising program
code instructions for executing the steps of a method accord-
ing to one embodiment of the invention when said program
is executed on a computer, and to a computer program
product comprising program code instructions recorded on a
computer-readable medium, for implementing the steps of a
method according to one embodiment of the invention when
said program is executed on a computer.

BRIEF DESCRIPTION OF THE DRAWINGS

The invention will be better understood and other fea-
tures, details and advantages will become more clearly
apparent on reading the non-limiting description that fol-
lows, and by virtue of the appended figures, which are given
by way of example.

Identical references may be used in different figures to
designate identical or comparable elements.

DETAILED DESCRIPTION

Figure 2:
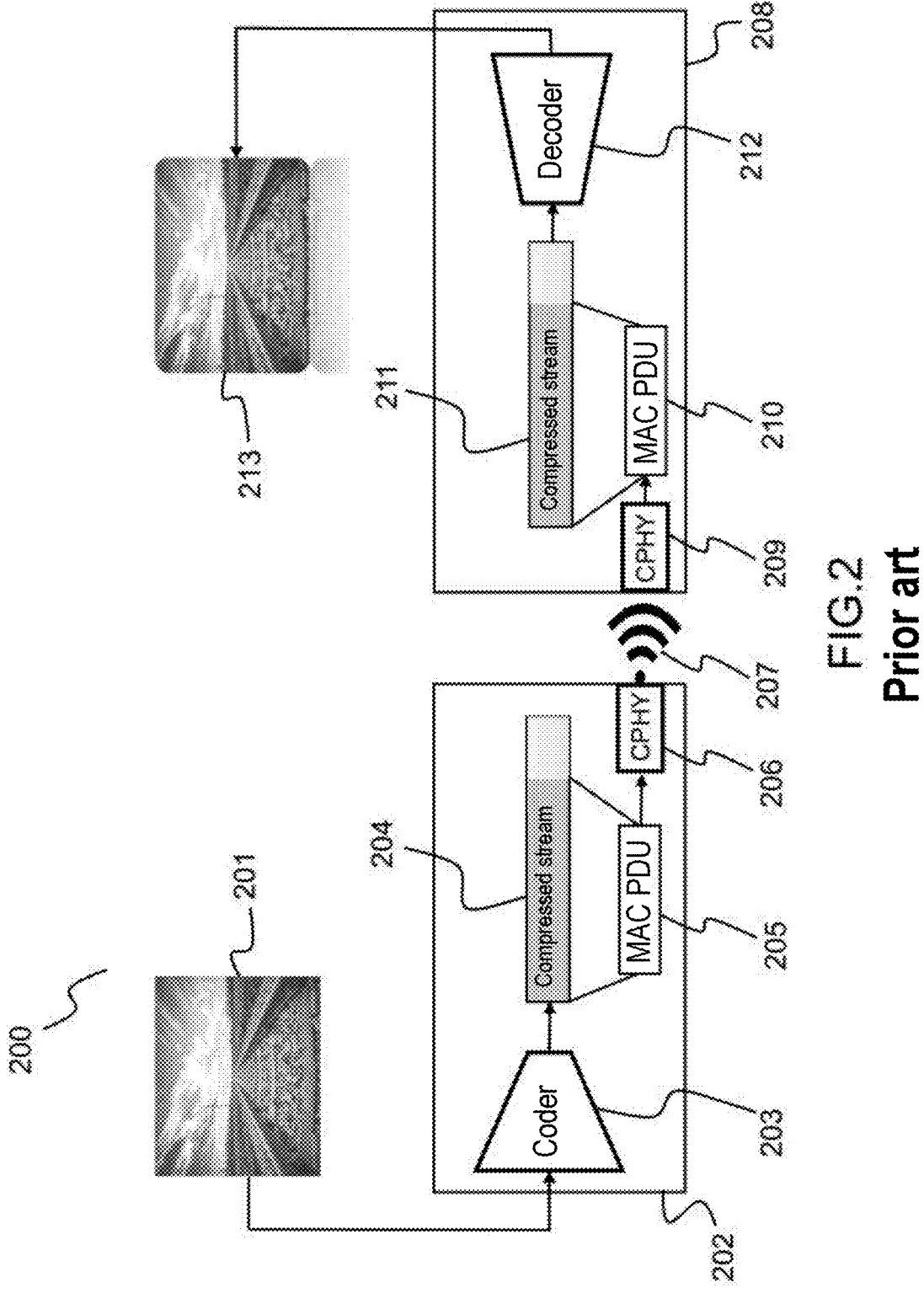
FIG. 2 shows a system for transmitting a video stream
over a limited-rate link according to the prior art.

FIG. 2 shows a system 200 for transmitting a video stream
over a limited-rate link according to the prior art.

The system comprises:

means 201 for acquiring an uncompressed video stream,
typically a camera, means 202 for compressing and sending the video stream.
These means are typically one or more computing
devices such as a microprocessor, a digital signal
processor (DSP), a field-programmable gate array
(FPGA), an application-specific integrated circuit
(ASIC), or any association of these means. They are
configured to implement:

a predictive video coder 203, for example a HEVC
coder, allowing a compressed video stream 204 to be
generated from the uncompressed video stream 201, means for sending the compressed video stream, which
are configured to store the compressed video stream,
divide it into frames 205 (or PDUs (PDU standing
for protocol data units)), the size of which depends
on the capacity and characteristics of the communi-
cations link over which the compressed video stream
is transmitted, and to implement the physical-layer
processing operations 206 required to format the
PDUs so that they may be sent over the communi-
cations link 207, which is typically a wireless radio
link or a wired link, means 208 for receiving and decompressing the video
stream received over the radio link 207. These means
are typically one or more computing devices such as a
microprocessor, a DSP, an FPGA, an ASIC or any
association of these means, configured to implement:

a device for receiving the compressed video stream,
configured to implement the physical-layer process-
ing operations 209 required to receive the PDUs 210,
and to reform the compressed video stream 211 from
the PDUs, a predictive video decoder 212, allowing the uncom-
pressed video stream to be reformed from the com-
pressed video stream 211, means 213 for processing, displaying or recording the
uncompressed video stream.

In the representation of FIG. 2, the means 202 for com-
pressing and sending the uncompressed video stream comprise the video coder and the transmission equipment. Alternatively, these two functions may be implemented by two separate pieces of equipment connected by any link (wired link, radio link, optical link, etc.). The same goes for the means 209 for receiving and decompressing the compressed video stream, these two functions being able to be implemented in separate pieces of equipment.

Figure 3:
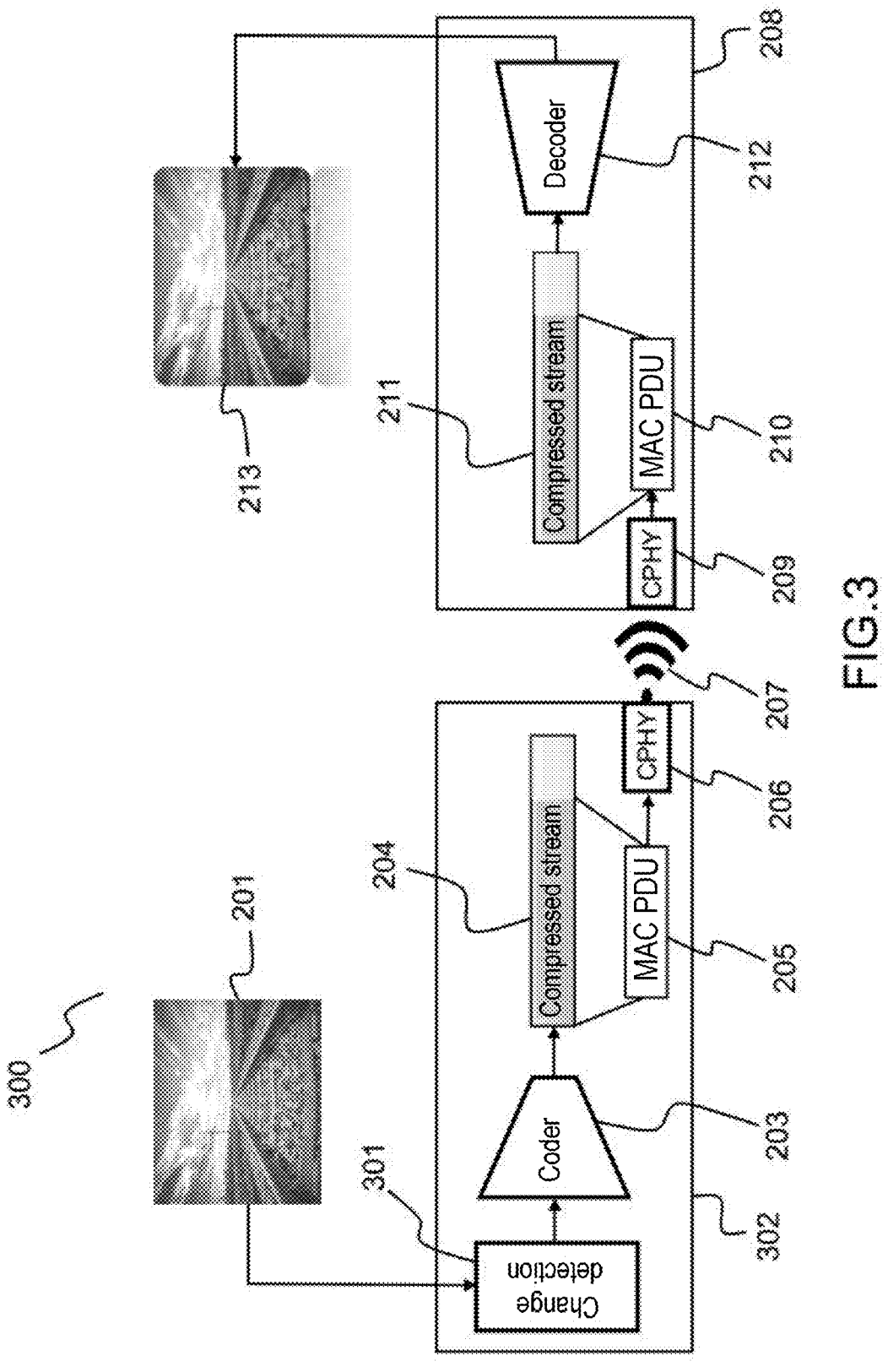
FIG. 3 shows a system for transmitting a video stream
over a limited-rate link according to the invention.

FIG. 3 shows one embodiment of a system 300 for transmitting a video stream over a limited-rate link according to the invention. This system comprises, in addition to the elements of FIG. 2, a device 301 configured to detect significant changes between the frames, which interfaces with the video-coder function 203. This device allows a change between two frames of the uncompressed video stream to be detected and quantized efficiently and inexpensively. It may equally well be implemented on the same computing means 302 as the coder 203 or on separate computing means interfacing with the video coder 203.

The invention relates to a method for analysing the change between two frames that is ideally applied to each pair of successive frames of the video stream. The method is based on estimation of a statistical deviation and of a shift between the two frames, either in one direction only (for example horizontally or vertically) or in two orthogonal directions. These estimated values make it possible to determine whether a change between two frames is significant or not, and possibly to quantify it more accurately. The remainder of the description will only attempt to describe the use case in which the statistical deviation and the shift are estimated in two orthogonal directions. Embodiments limited to analysis in the horizontal or vertical domain only may be easily deduced from the described two-direction embodiment.

Alternatively, in order to decrease the number of computations to be carried out, the method may be implemented on non-successive frames, for example by estimating the statistical deviation and the shift between two frames separated by N frames of the video stream, with N greater than or equal to two.

The invention therefore relates to a method for analysing the change between two frames of a video stream before its compression. This method comprises estimating a shift and statistical deviation between all or part of said frames in at least one direction, and comparing the one or more shifts and statistical deviations with thresholds in order to detect a significant change between said frames.

Figure 4:
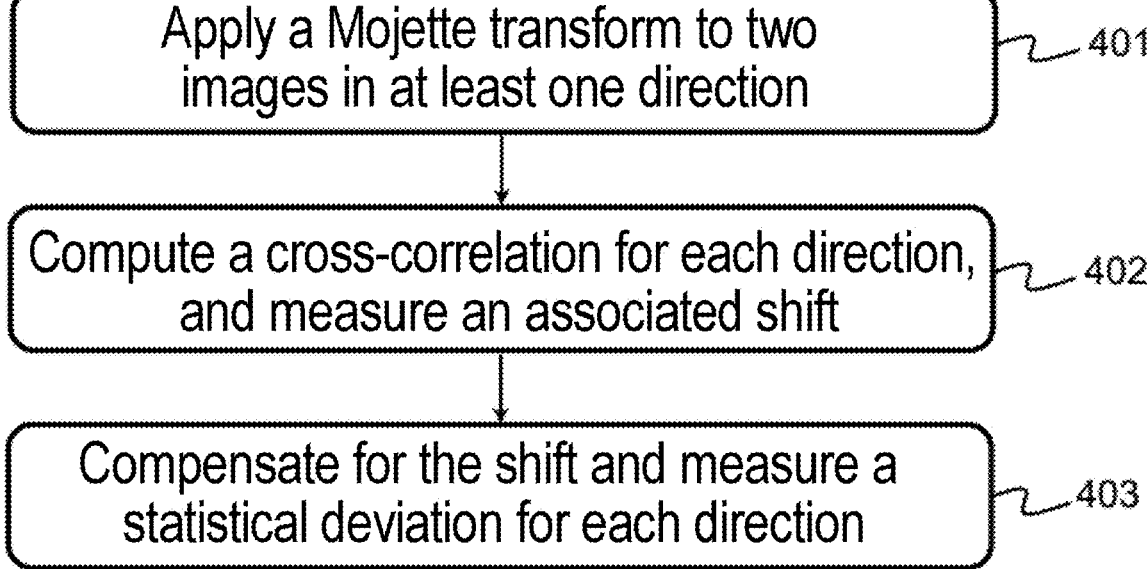
FIG. 4 is a flowchart illustrating estimation of a shift and
of a statistical deviation in a method for analysing the
change between two frames of an uncompressed video
stream according to one embodiment of the invention.

FIG. 4 is a flowchart illustrating estimation of a shift and of a statistical deviation in a method for analysing the change between two frames of an uncompressed video stream according to one embodiment of the invention. This estimation comprises a first step 401 of applying a Mojette transform to each of the frames in order to determine, for each frame and for each direction in question, a vector corresponding to a projection of the frame in this direction.

The Mojette transform is an exact discrete application of the Radon transform. It has the advantage of being very simple to implement since it uses only additions and subtractions of integers. Applied to a frame in the horizontal or vertical direction, it consists in summing the pixels of each row or column of the frame, respectively. Thus, the output of the Mojette transform applied in a given direction to a frame is a vector the size of which corresponds to the size of the frame in the orthogonal direction.

The Mojette transform may be applied to all of the frame in question, or to only one segment of the frames, this further limiting the computational complexity required to implement the invention and making it possible not to consider the edges of the frame, which are liable to disappear from one frame to another as a result of movement of the camera acquiring the video stream.

According to one embodiment of the invention, estimating the shift and statistical deviation of the method for analysing the change between two frames of an uncompressed video stream then comprises a second step 402 of computing, for each direction in question, a cross-correlation between the vectors obtained by applying a Mojette transform in the first step 401 of the method, then measuring a shift associated with each direction based on the results of the one or more cross-correlations. The shift corresponds to the maximum of the cross-correlation, obtained either directly from the discretized values or, for greater accuracy, via polynomial approximation or via an equivalent mathematical method. Thus, at the end of the second step 402, a shift between the two frames will have been measured in each of the directions in question, which shift corresponds to the equivalent of the estimated movement between two frames in the direction in question.

According to one embodiment of the invention, estimating the shifts and statistical deviations of the method for analysing the change between two frames of an uncompressed video stream lastly comprises a third step 403 of compensating for the shift computed for each direction in the second step of the method in the corresponding vectors obtained in the first step 401 of the method, then of measuring, for each direction in question, a statistical deviation between the vectors compensated for the corresponding shift.

Thus, the vectors obtained by the Mojette transforms are shifted so as to be aligned before measuring their statistical deviation.

The statistical deviation may for example be measured by integrating the differences between the vectors in question.

The shift (or shifts) and the statistical deviation (or statistical deviations) measured by the method for analysing the change between two frames of an uncompressed video stream according to the invention make it possible to quantify the resemblance of two frames, and to adapt the behaviour of the coder of the video stream depending on the temporal continuity between the frames.

Figure 5:
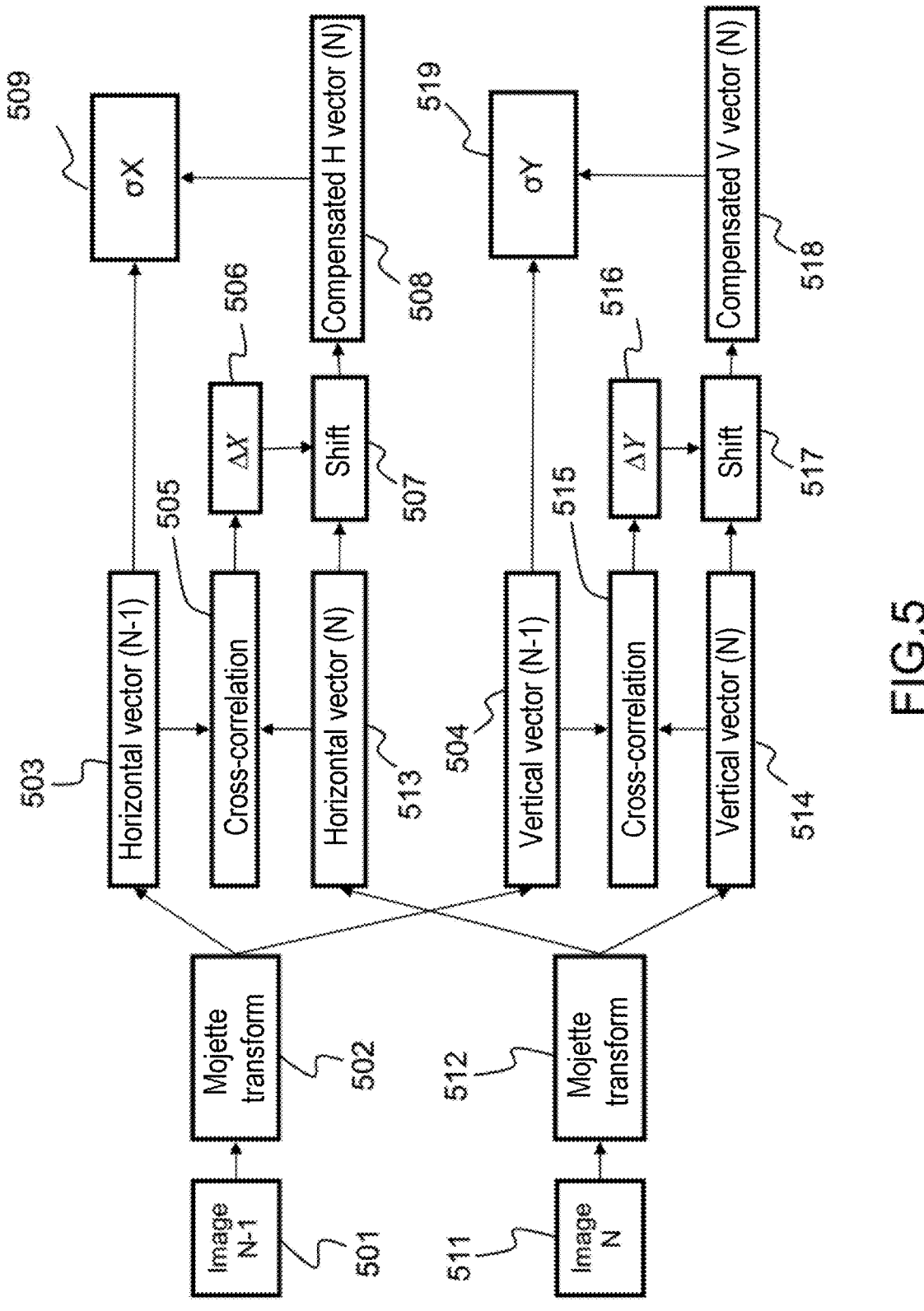
FIG. 5 shows, in the form of a block diagram, the
principles of determining a shift and a statistical deviation
between two frames in a method for analysing the change
between two frames of an uncompressed video stream
according to one embodiment of the invention.

FIG. 5 shows, in the form of a block diagram, the principles of determining a shift and a statistical deviation between two frames in a method for analysing the change between two frames of an uncompressed video stream according to one embodiment of the invention. In this embodiment, the measurements are made in two orthogonal (horizontal and vertical) directions.

The input of the measurements are two frames 501 and 511 of an uncompressed video stream, typically but not necessarily successive frames. A Mojette transform 502/512 is carried out on each of the frames in the horizontal and vertical directions. The results of each Mojette transform are a vector associated with the horizontal direction 503/513, and a vector associated with the vertical direction 504/514. A cross-correlation 505/515 is carried out between the vectors associated with a given direction. A horizontal shift $\Delta X$ 506 is computed based on the cross-correlation carried out on the horizontal vectors 503 and 513, typically by determining the position of the correlation peak. Likewise, a vertical shift $\Delta Y$ 516 is computed based on the cross-correlation carried out on the vertical vectors 504 and 514.

The horizontal vectors 503 and 513 are realigned by compensating for the horizontal shift between the two frames, for example by applying a shift 507 equal to $\Delta X$ or $-\Delta X$ to one of the horizontal vectors to obtain a compensated horizontal vector 508, and by adjusting the size of the vectors 503 and 508 accordingly. Similarly, the vertical vectors 504 and 514 are realigned by compensating for the vertical shift between the two frames, for example by applying a shift 517 equal to $\Delta Y$ or $-\Delta Y$ to one of the vertical vectors to obtain a compensated vertical vector 518, and by adjusting the size of the vectors 504 and 518 accordingly.

Lastly, a horizontal statistical deviation $\sigma X$ 509 is computed between the realigned horizontal vectors 503 and 508. Likewise, a vertical statistical deviation $\sigma Y$ 519 is computed between the realigned vertical vectors 504 and 518. This statistical deviation may be computed in various ways, such as for example via a sum of absolute differences.

The values of the shifts $\Delta X$ and $\Delta Y$ and of the statistical deviations $\sigma X$ and $\sigma Y$ characterize and quantify the changes between the two frames. They may be compared with thresholds in order to determine the strategy to adopt for video coding of the stream.

The invention relates to the method for analysing the change between two frames of an uncompressed video stream described above, but also to a method for coding a video stream using the method for analysing the change between two frames according to the invention.

Figure 6:
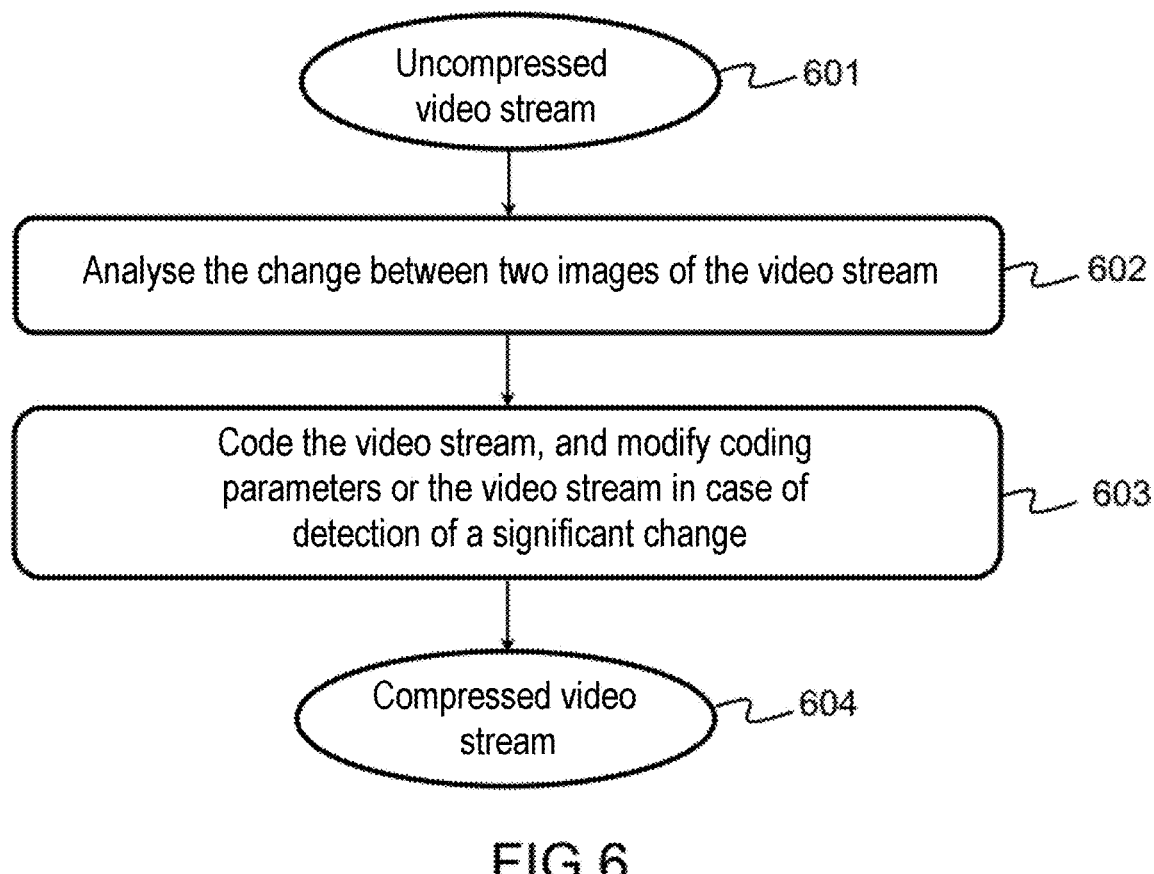
FIG. 6 shows a flowchart of a method for coding a video
stream according to one embodiment of the invention.

FIG. 6 shows a flowchart of a method for coding a video stream according to one embodiment of the invention. The method receives as input an uncompressed video stream 601 comprising a succession of frames, and carries out in succession:

a step 602 of analysing the change between two frames of the video stream. This step may be applied systematically to every pair of successive frames of the uncompressed video stream 601, or to a sub-sample of the frames of the video stream;

a step 603 of coding the frames of the uncompressed video stream 601 using a conventional predictive video-coding method, such as for example HEVC coding, in which, when a significant change is detected, the video stream is modified or coding parameters of the video stream are modified so as to attenuate an increase, in the instantaneous rate of the coder, that is associated with scene change between the two frames. This modification is therefore temporary.

The output of the method for coding a video stream is a video stream 604 that is compressed in such a way as to avoid the instantaneous rate peaks that potentially lead to an increase in latency, frame losses and/or a decrease in image quality in prior-art devices when the video stream varies abruptly.

The step 602 of analysing the change between two frames of the video stream may comprise raising an alarm when a significant change is detected. To this end, the computed shifts $\Delta X$ and/or $\Delta Y$ and statistical deviations $\sigma X$ and/or $\sigma Y$ may each be compared with a threshold, and an alarm raised when one or more of these indicators exceeds the threshold. When a threshold is crossed it means that there is enough difference between the current frame and the previous frame to trigger the change in parameterization before the current frame is coded. The values of the thresholds are to be determined on a case-by-case basis depending on the size of the frames in question, on the capabilities of the video coder, on the objective target rate, on the latency constraints, on the strategy used to modify the parameters of the implemented coder and on the capacities of the data link over which the video stream is transmitted.

Alternatively, when the shifts and statistical deviations computed in two directions, the thresholds may be applied to the sum of the squares (or absolute values) of the shifts and/or to the sum of the squares (or absolute values) of the statistical deviations, this making it possible to take into account the movement/statistical deviation simultaneously in both directions.

Advantageously, the step 602 of analysing the change between two frames of the video stream may comprise quantifying the magnitude of the change between the two frames. This quantification may be obtained by comparing one or more of the computed shifts and statistical deviations, or a combination of shifts or a combination of statistical deviations, with a plurality of thresholds in order to determine the magnitude of the change. For example, the sum of the absolute values of the statistical deviations $\sigma X$ and $\sigma Y$ may be compared with two thresholds to determine whether the statistical deviation between the two frames is large (which is characteristic of a substantial change between the two frames despite the motion compensation performed by compensating for the shifts $\Delta X$ and/or $\Delta Y$), medium (which is characteristic of a change that is substantial, but where a large part of the frame is present in the other frame), or small (which is characteristic of little or no scene changes between the two frames). This quantification of the magnitude of the change makes it possible to adapt the strategy used by the video coder to take into account the scene change.

According to various embodiments of the invention, the modification of the coding parameters of the video stream carried out when a significant change between the current frame and a previous frame is detected may comprise, when the current frame uses inter-frame prediction:

adapting the quantization step used to code the current frame, in order to reduce its size. A plurality of quantization levels may be envisaged, in particular when the magnitude of the change between the frames is quantified. Unlike the prior art illustrated in FIG. 1*b* where an instantaneous rate peak associated with a scene change is compensated for by decreasing the rate of subsequent frames, the quantization step of the frame where the scene change occurs may be increased, thus limiting the instantaneous rate peak. Advantageously, the quantization step of the following frames may also be modified:

when the video coder has a rate setting, by (temporarily) reducing this setting, this being equivalent to increasing the quantization step;

forcing the current frame to be coded using an intra-frame prediction mode (I-frame). Specifically, when temporal continuity is limited, coding the current frame using intra coding is generally more efficient than using inter coding in this specific case;

starting a new GOP, thus abandoning the current group of pictures. Since GOPs generally start with a frame predicted by intra prediction, the size of which frame is independent of the temporal continuity between the frames of the video stream, this amounts to forcing the current frame to be coded by intra prediction while postponing the occurrence of the next intra frame.

According to another embodiment in which the frames in question are successive frames, when a significant change is detected between the current frame and the previous frame, the current frame is replaced by the previous frame in the video stream. This duplication of the oldest frame has the effect of shifting arrival of the scene change, but has no impact on the latency of the video. Since the new current frame is a copy of the previous frame, it is able to be coded very efficiently, this creating a momentary drop in instantaneous rate, allowing the instantaneous rate peak that will appear when the next frame following the scene change is coded to be completely or partially absorbed.

These various embodiments are not incompatible. In particular, when the magnitude of the change is quantified, the policy of adjustment of the coding parameters of the video stream may combine these various embodiments, for example by coding the current frame with intra prediction when the statistical deviation between the frames is very small, by adjusting the quantization parameters of the current frame when the statistical deviation is medium, and by doing nothing when the statistical deviation is large.

Figures 1A, 1B, 1C:
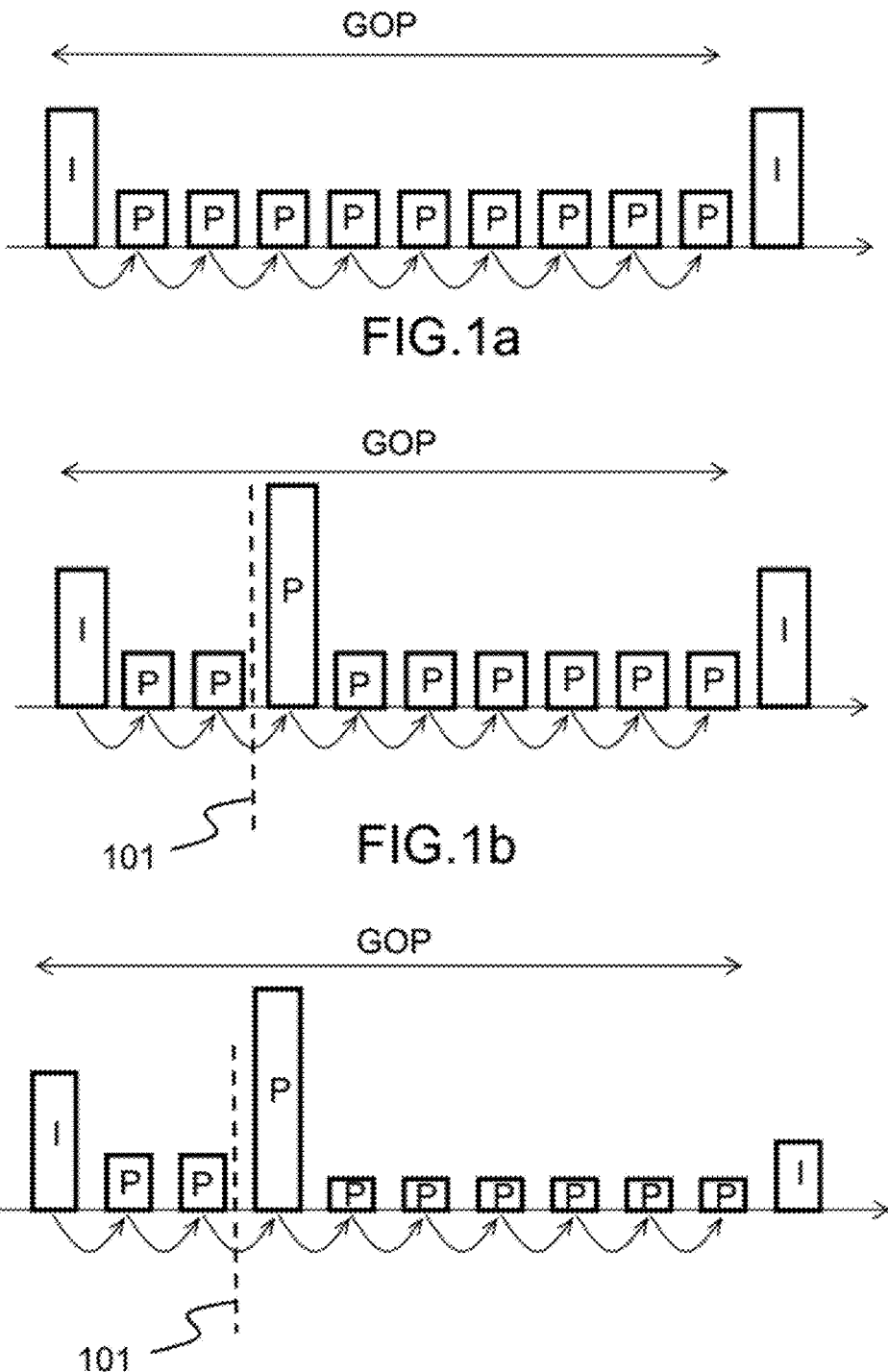
FIG. 1a schematically shows the principles of predictive
coding for frames of a video stream.
FIG. 1b illustrates the impact of a significant change on
the predictive coding of FIG. 1a for a prior-art coder that
does not dynamically adjust the rate of the compressed video
stream.
FIG. 1c illustrates the impact of a significant change on
the predictive coding of FIG. 1a for a prior-art coder that
dynamically adjusts the rate of the compressed video stream.
Figure 7A:
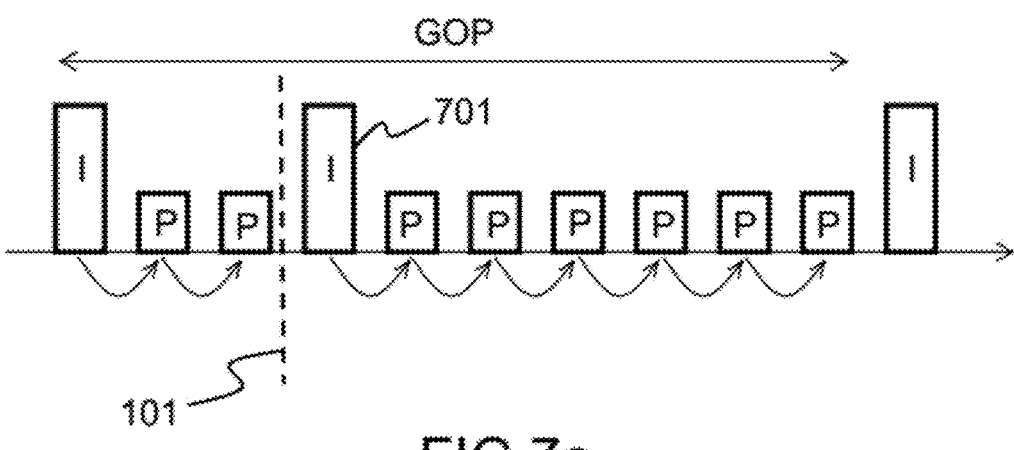
FIG. 7a illustrates the impact of a significant change on
the predictive coding of FIG. 1a for coding of an uncom-
pressed video stream according to one embodiment of the
invention in which, following detection of a significant
change, the coder uses intra prediction to code the current
frame.

FIG. 7a illustrates the impact of a significant change on the predictive coding of FIG. 1a for coding of an uncompressed video stream according to one embodiment of the invention in which, following detection of a significant change, the coder uses intra prediction to code the current frame 701. This embodiment makes it possible to reduce the size of the current frame with respect to the use of inter-frame prediction (illustrated in FIG. 1b) and therefore to limit the instantaneous rate peak of the video coder associated with the scene change.

Figures 7B, 7C:
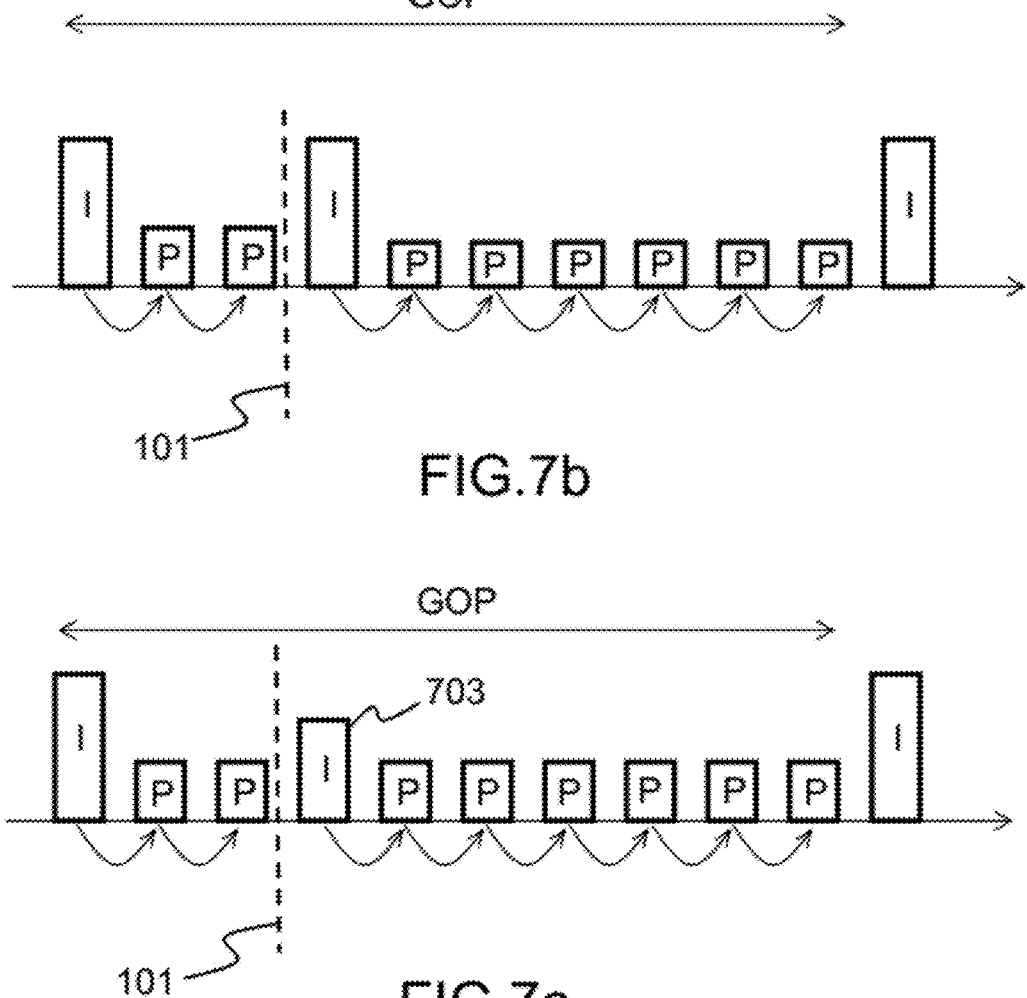
FIG. 7b illustrates the impact of a significant change on
the predictive coding of FIG. 1a for coding of an uncom-
pressed video stream according to one embodiment of the
invention in which, following detection of a significant
change, the coder uses intra prediction to code the current
frame, and where the quantization parameters of the
P-frames of the GOP following the current frame are
adjusted so as to compensate for the rate increase associated
with the scene change.
FIG. 7c illustrates the impact of a significant change on
the predictive coding of FIG. 1a for coding of an uncompressed video stream according to one embodiment of the
invention in which, following detection of a significant
change, the coder uses intra prediction to code the current
frame 702, and where the quantization parameter of the
current frame is adjusted so as to compensate for the rate
increase associated with the scene change.

FIG. 7b illustrates the impact of a significant change on the predictive coding of FIG. 1a for coding of an uncompressed video stream according to one embodiment of the invention in which, following detection of a significant change, the coder uses intra prediction to code the current frame 702, and where the quantization parameters of the P-frames of the GOP following the current frame are adjusted so as to compensate for the rate increase associated with the scene change.

FIG. 7c illustrates the impact of a significant change on the predictive coding of FIG. 1a for coding of an uncompressed video stream according to one embodiment of the invention in which, following detection of a significant change, the coder forces the use of intra prediction to code the current frame 703, and where the quantization parameter of the current frame is adjusted so as to compensate for the rate increase associated with the scene change.

Figures 7D, 7E:
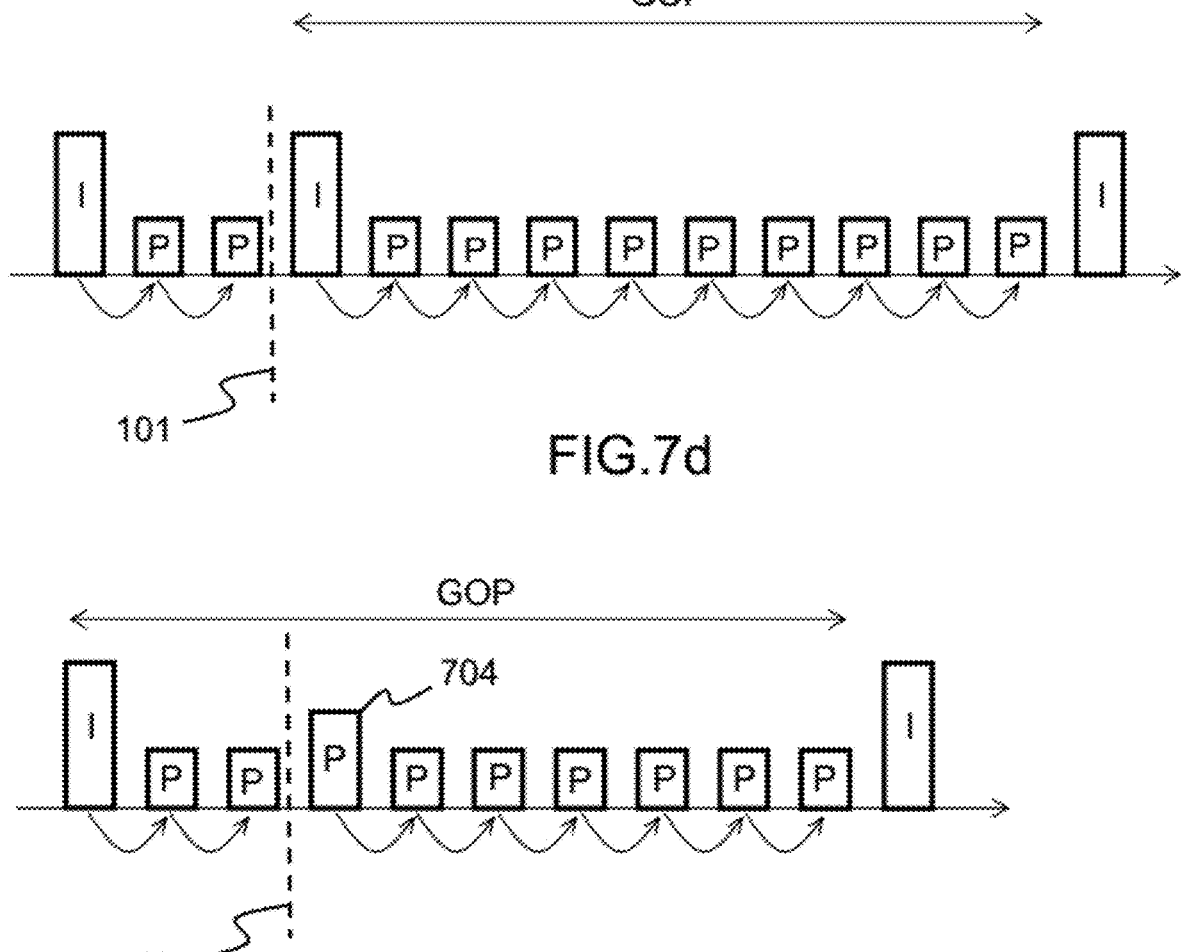
FIG. 7d illustrates the impact of a significant change on
the predictive coding of FIG. 1a for coding of an uncom-
pressed video stream according to one embodiment of the
invention in which, following detection of a significant
change, the current group of pictures (GOP) is interrupted,
and a new group of pictures is started.
FIG. 7e illustrates the impact of a change of medium
magnitude on the predictive coding of FIG. 1a for coding of
an uncompressed video stream according to one embodi-
ment of the invention in which, following detection of a
significant change, the coder adjusts the quantization param-
eter of the current frame so as to compensate for the rate
increase associated with the scene change.

FIG. 7d illustrates the impact of a significant change on the predictive coding of FIG. 1a for coding of an uncompressed video stream according to one embodiment of the invention in which, following detection of a significant change, the current group of pictures (GOP) is interrupted, and a new group of pictures is started. This embodiment makes it possible to use intra-frame prediction for the current frame, and thus to limit the increase in the rate peak. When the scene change occurs towards the end of the GOP, slightly anticipating the beginning of the next GOP has very little impact on the average rate of the coder. The instantaneous rate is then less affected by the scene change than if the method was not implemented. When the scene change occurs at the beginning of the GOP, starting a new GOP, and therefore having two closely spaced I-frames, may impact the rate. It is then possible to modify the quantization step of the one or more following frames in order to smooth the increase in rate, or to choose a different embodiment.

FIG. 7e illustrates the impact of a significant change of medium (rather than large) magnitude on the predictive coding of FIG. 1a for coding of an uncompressed video stream according to one embodiment of the invention in which, following detection of a medium change, the coder adjusts the quantization parameter of the current frame 704 so as to compensate for the rate increase associated with the scene change.

The method for analysing the change between two frames according to the invention makes it possible to identify abrupt scene changes that adversely affect the compression efficiency of the inter-frame prediction. This detection, which is performed upstream of the coder, allows the coder to be configured accordingly, in order to dampen the effect of this change on the rate of the video coder, and thus avoid uncontrolled rate peaks, which are undesirable when transmission capacity is limited.

Another aspect of the invention is that its computational complexity is very low, since it is based on a Mojette transform that requires only adders and subtracters to implement. Furthermore, it may be implemented independently of the video coder, and is thus applicable to any parameterizable predictive video coder. Lastly, the invention does not require any modification of the decoder to be implemented.

The invention relates to a method for analysing the change between two frames, but also to a device configured to implement the method. This device receives as input an uncompressed video stream 201, and delivers information representative of the presence of changes, which may be:

a Boolean indicating the presence or absence of a significant change, information relating to the magnitude of the change between the two frames in question, or configuration parameters of a video coder, for example such as quantization-step values, rate values, instructions regarding the type of predictive coding to be used, or instructions regarding resetting a group of pictures.

Alternatively, the device may implement the method for analysing the change between two frames according to the invention on pairs of successive frames, and be configured to modify the video stream by copying the oldest frame into the newest frame when a significant change is observed. In this case, it is possible but not essential to provide additional information.

The invention also relates to a device 302 configured to implement a method for analysing the change between two frames according to one embodiment of the invention, and to code the uncompressed video stream, by modifying the parameters of the coder and/or the uncompressed video stream when a significant change between the two frames is detected. Advantageously, the device may also comprise means for sending the compressed video stream over a transmission link.

The invention also relates to a system (300) for transmitting a video stream, comprising:

means for acquiring a video stream, such as one or more cameras, computing means configured to implement a method for coding an uncompressed video stream according to one embodiment of the invention on the video stream to obtain a compressed video stream, means for sending the compressed video stream, i.e. a piece of radiocommunication equipment configured to transmit the compressed video stream to another piece of radiocommunication equipment over a wired or wireless radio link, means for acquiring the compressed video stream, means for decoding the compressed video stream to obtain a decompressed video stream, and means for displaying the decompressed video stream.

Lastly, the invention relates to a computer program and to a computer program product comprising program code instructions in order to execute a method for analysing the change between two images of an uncompressed video stream according to the invention, optionally associated with program code instructions regarding coding of the video stream and instructions intended to modify the video stream or parameters of the coding of the video stream when a significant change is detected.

The invention claimed is:

1. A method for analysing the change between two frames of an uncompressed video stream, said method being comprising estimating a shift and a statistical deviation between all or part of said frames in at least one direction, and using the one or more computed shifts and statistical deviations to detect a significant change between said frames.

2. The method for analysing the change between two frames of an uncompressed video stream according to claim 1, wherein estimating a statistical deviation and a shift between all or part of said frames in at least one direction comprises, for each direction in question:

a first step of applying a Mojette transform to each of said frames in order to determine, for each frame, a vector corresponding to a projection of the frame in said direction, a second step of computing a cross-correlation between the vectors obtained by applying a Mojette transform to the two frames in the first step of the method, then measuring a shift based on the results of said cross-correlations, a third step of measuring a statistical deviation between the vectors obtained by applying a Mojette transform to the two frames in the first step of the method, after compensating for the associated shift computed in the second step of the method.

3. The method for analysing the change between two frames of an uncompressed video stream according to claim 1, wherein said at least one direction comprises one or more directions selected from a horizontal direction and a vertical direction.

4. The method for analysing the change between two frames of an uncompressed video stream according to claim 1, wherein using the one or more computed shifts and statistical deviations to detect a significant change between said frames comprises:

comparing the one or more shifts or a combination of the shifts with one or more thresholds, and comparing the one or more statistical deviations or a combination of statistical deviations with one or more thresholds.

5. The method for analysing the change between two frames of an uncompressed video stream according to claim 4, wherein at least one among the one or more shifts or the combination of shifts and the one or more statistical deviations or the combination of statistical deviations is compared with a plurality of thresholds in order to quantify the magnitude of said change.

6. The method for coding an uncompressed video stream composed of a succession of frames, said method comprising, for at least one pair of frames among said succession of frames, a step of analysing the change between two frames of an uncompressed video stream according to claim 1, and a step of predictively coding the uncompressed video stream, in which step, when a significant change is detected in the step of analysing the change, the uncompressed video stream or coding parameters of the video stream are modified so as to attenuate an increase, in the rate of the video stream after predictive coding, that is associated with said significant change.

7. The method for coding an uncompressed video stream according to claim 6, wherein modifying the coding parameters comprises one or more elements among:

modifying a quantization step of the predictive video coding, reducing a rate setting applied to the predictive video coding, using an intra-frame coding mode, starting a new group of pictures (GOP), replacing the oldest frame with the newest frame.

8. The method for coding an uncompressed video stream according to claim 6, wherein the frames of said pair of frames are successive frames of the uncompressed video stream, and wherein modifying the uncompressed video stream comprises copying the oldest frame instead of the newest frame.

9. A device comprising computing means configured to implement a method according to claim 1.

10. A system for transmitting a video stream, comprising:

means for acquiring an uncompressed video stream, computing means configured to implement a method for coding an uncompressed video stream according to claim 6 on said uncompressed video stream to obtain a compressed video stream, means for transmitting the compressed video stream, means for acquiring the compressed video stream, means for decoding the compressed video stream to obtain a decompressed video stream, and means for displaying the decompressed video stream.

11. A computer program product comprising program code instructions for implementing the steps of the method according to claim 1 when said computer program is executed on a computer.

12. A computer-readable recording medium on which a computer program product according to claim 11 is recorded.

* * * * *